UNITED STATES PATENT OFFICE.

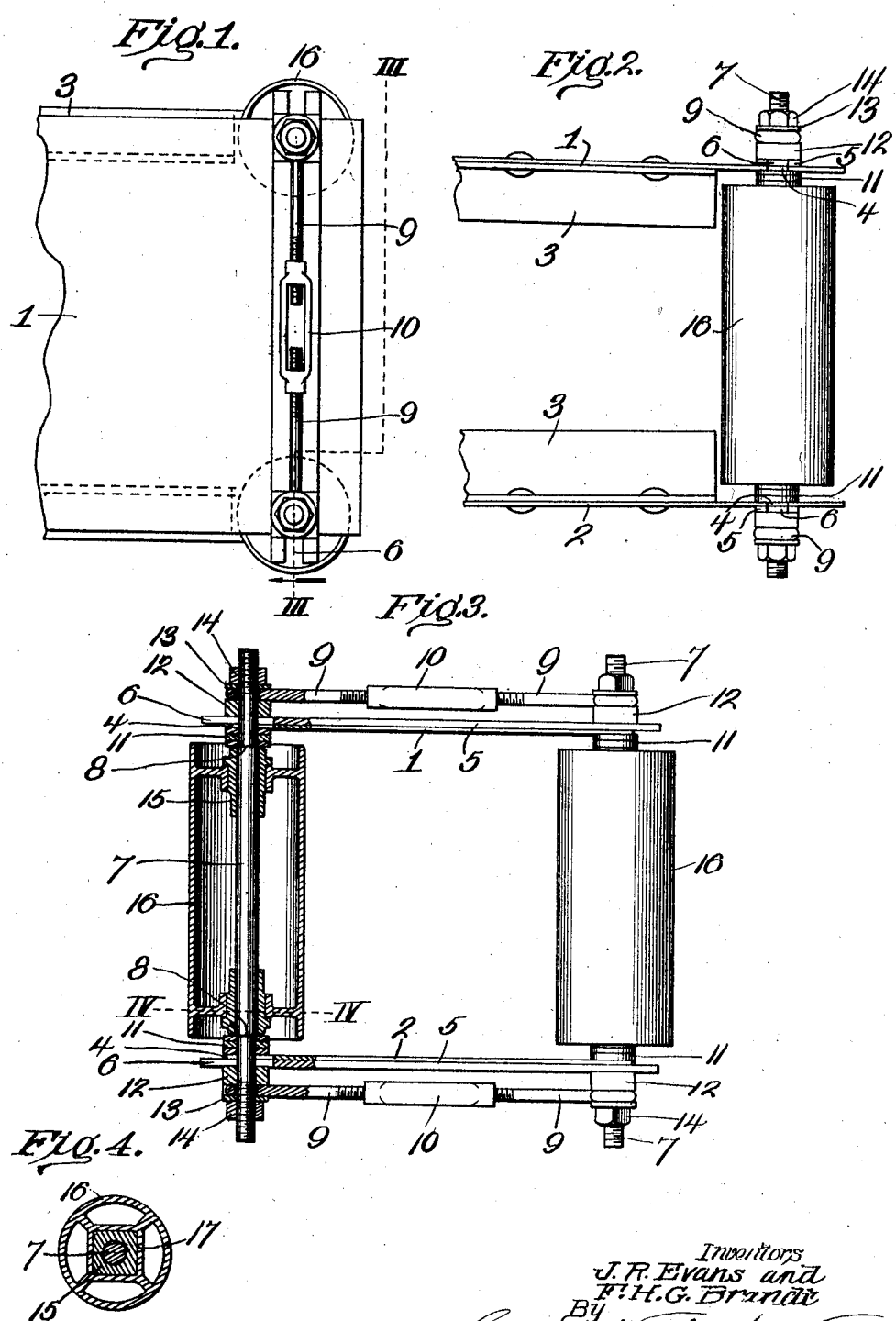

JOHN R. EVANS AND FOKKO H. G. BRANDT, OF KANSAS CITY, KANSAS, ASSIGNORS, BY MESNE ASSIGNMENTS, TO KANSAS CITY AUTOMATIC HAY PRESS COMPANY.

BALING-PRESS.

1,333,068.   Specification of Letters Patent.   Patented Mar. 9, 1920.

Application filed November 13, 1916, Serial No. 131,337. Renewed September 19, 1919. Serial No. 324,990.

*To all whom it may concern:*

Be it known that we, JOHN R. EVANS and FOKKO H. G. BRANDT, citizens, respectively, of the United States and Germany, residing at Kansas City, in the county of Wyandotte and State of Kansas, have invented certain new and useful Improvements in Baling-Presses, of which the following is a specification.

This invention relates to baling presses and our object is to produce adjustable anti-friction devices for compressing the front ends of bales to effect the baling operation with a minimum expenditure of power and permit the bales to be more tightly wired.

With this object in view, the invention consists in certain novel and peculiar features of construction and combinations of parts as hereinafter described and pointed out in the appended claims; and in order that it may be fully understood reference is to be had to the accompanying drawing, in which—

Figure 1, is a top plan view of the discharge end of the baling chamber of a baling press equipped with devices embodying the invention.

Fig. 2, is a side view of the same.

Fig. 3, is a vertical section taken on the line III—III of Fig. 1.

Fig. 4, is a section on the line IV—IV of Fig. 3 with the underlying parts omitted.

In the said drawing, 1 is the top, 2 the bottom and 3 the sides constituting the bale compression chamber of a baling press, the sides terminating short of the rear ends of the top and bottom and rearward of said sides the top and bottom are provided in each side edge with transverse slots or notches 4, and reinforcing the top and bottom and extending transversely of and projecting beyond the side margins of the same are cross bars 5, provided with end slots 6 registering with slots or notches 4.

7 indicates vertical shafts reduced to provide shoulders 8 and beyond said shoulders extending through the vertically alined slots 4 and 6, and through inwardly projecting eye-bolts 9, each alined pair of said eye bolts being connected by a turnbuckle 10. The connections constituted by bolts 9 and turn-buckles 10 hold the shafts 7 a fixed distance apart and in parallel relation, and to secure them in fixed relation to the compression chamber composed of parts 1 to 3 inclusive, the following construction is provided: 11 indicates one or a plurality of collars or washers fitted on each reduced portion of each shaft 7, said collars or washers bearing against the shoulders of their respective shafts 7, the upper collars or washers 11 bearing against the top 1 of the compression chamber and the lower set of collars or washers 11 bearing against the bottom of said compression chamber.

12 are collars fitted on the ends of the bolts and bearing against the cross bars 5 and the adjacent portions of the bolts 9. 13 are washers fitted on the bolts and engaging the outer faces of the bolts 9, and 14 are clamping nuts engaging the ends of the shafts and clamping the turn-buckle connections and the top and bottom of the compression chamber in rigid relation with the shafts 7.

15 are squared sleeves or hubs journaled on shafts 7 and 16 are vertical rollers provided with squared openings 17 snugly receiving the squared sleeves or hubs 15.

From the above description it will be apparent that each bale will be compressed horizontally as it is forced between the rollers 16 which constrict the width of the compression chamber to some extent by projecting inwardly beyond the side walls of said chamber, but owing to the fact that said rollers are free to turn, the friction between the sides of the bale and the sides of the compression chamber is minimized. It is further obvious that by compressing the bale by said rollers, the bale ties not shown, which are secured around the bale in the customary or any preferred manner, will hold the bale more tightly because of the longitudinal expansion of the bale which will take place as the bale is passing said rollers. In the event that it is desired to increase or decrease the lateral compression applied on the bale, the nuts 14 will be turned back slightly and then the turn-buckles will be operated to draw the shafts closer together or force them farther apart, respectively, and after such adjustment the clamping nuts 14 will be turned to clamp the turn buckle connections and the roller-carrying shafts in rigid relation with the top and bottom of the compression chamber.

In the event it is desired to apply pressure upon the upper and lower sides of the bale, it can be accomplished by removing one or more of the collars or washers 11 and then screwing the clamping nuts 14 home until the top and bottom of the baling chamber are clamped against the remaining washers 11. In the event it is desired to increase the height of the bale, additional washers 11 will be inserted between the shoulders 8 of the shafts and the top and bottom of the compression chamber, or between one set of said shoulders and the adjacent portion whether it be the top or bottom of the compression chamber.

From the above description, it will be apparent that we have produced a baling press embodying the features of advantage enumerated as desirable and we wish it to be understood that while we have illustrated and described what we believe to be the preferred embodiment of the invention, we reserve the right to make all changes falling within the spirit and scope of the appended claims.

We claim:

1. The combination with the discharge end of the compression chamber of a baling press, of rollers at opposite sides of and projecting into the compression chamber beyond the corresponding sides thereof, parallel shafts forming journals for said rollers and adjustable sidewise in the top and bottom of the baling chamber, means connecting the ends of the shafts of said rollers above and below the compression chamber, and means for clamping said connecting means and the top and bottom of the baling chamber in rigid relation to said shafts.

2. The combination with the discharge end of the compression chamber of a baling press, of rollers at opposite sides of and projecting into the compression chamber beyond the corresponding sides thereof, parallel shafts forming journals for said rollers and adjustable sidewise in the top and bottom of the baling chamber, expansible and contractible connections connecting said shafts together above and below the compression chamber, and means for clamping said connections, shafts and the top and bottom of the compression chamber in rigid relation.

In testimony whereof we affix our signatures in the presence of two witnesses.

JOHN R. EVANS.
FOKKO H. G. BRANDT.

Witnesses:
G. Y. THORPE,
DENIS J. DOWNEY.